March 1, 1938. P. E. DOUBLE 2,110,039
CLINCH NUT
Filed May 26, 1936
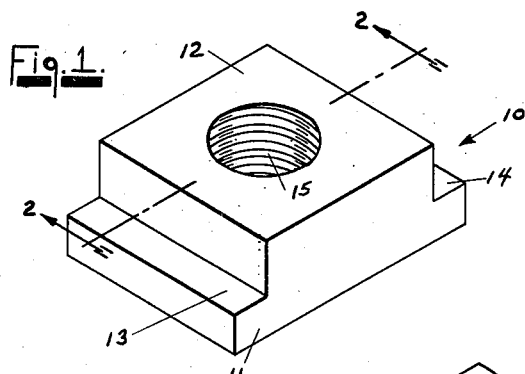
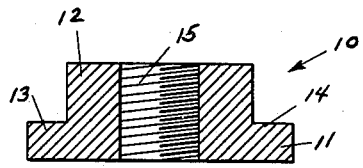
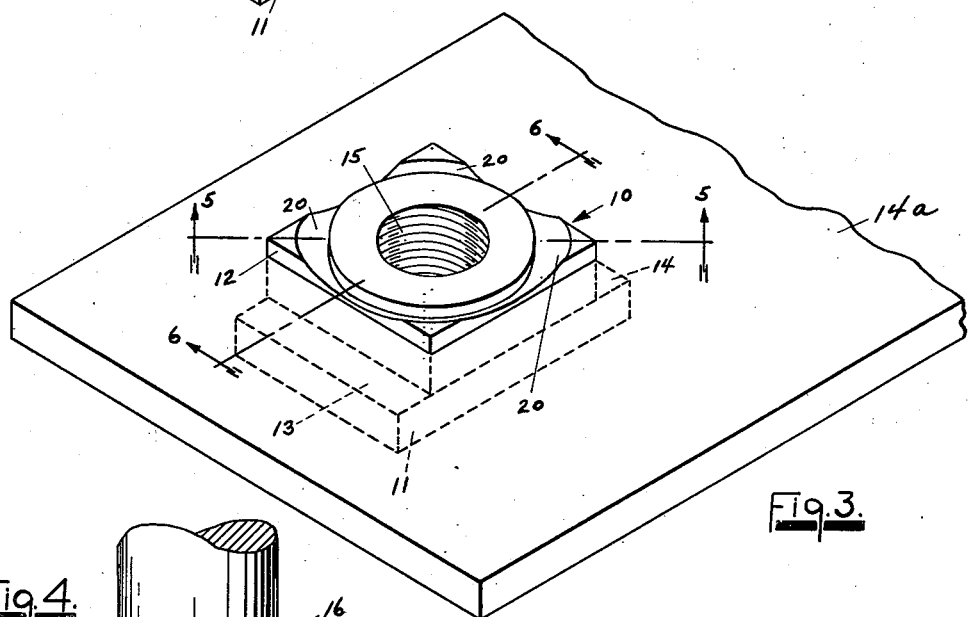
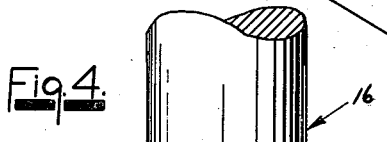
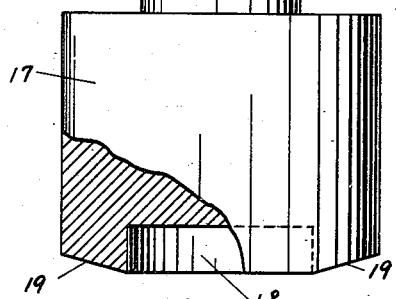
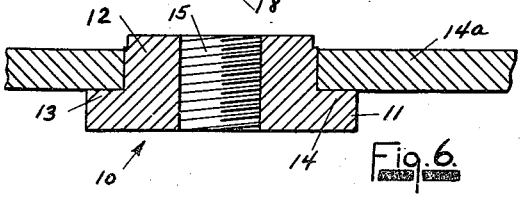
INVENTOR.
PLUMMER. E. DOUBLE
BY Edward M. Apple
ATTORNEY.

Patented Mar. 1, 1938

2,110,039

UNITED STATES PATENT OFFICE 2,110,039

CLINCH-NUT

Plummer E. Double, Detroit, Mich.

Application May 26, 1936, Serial No. 81,887

4 Claims. (Cl. 85—32)

This invention relates to clinch-nuts and has particular reference to such a nut and the method of attaching it to a piece of sheet steel or the like.

The invention has for one of its objects the provision of a clinch-nut of the type hereinafter described and which may be easily and firmly attached or clinched to sheet steel. The device will have wide application in the manufacture of automobiles, stoves, refrigerators, locks and similar articles wherein it is necessary to provide a simple means of attachment, often in places difficult to reach by ordinary means.

Another object of the invention is the provision of a clinch-nut which may be easily and economically manufactured. The present invention will effect a large saving in that it will be possible to produce it by equipment already available, thus eliminating the necessity of a large initial outlay of money for new equipment.

A further object of the invention is the provision of a clinch-nut having positive locking means, thereby obviating the possibility of looseness developing after the clinching operation. Furthermore, it readily lends itself to attaching in places now considered difficult with the conventional clinch-nut. Due to its shape it permits of speedier attachment to the metal because of the ease in locating it in the hole formed in the metal.

An advantageous feature of the nut resides in the ease with which the nut may be handled in automatic attaching machines. In addition, all possibility of thread damage in the clinching operation is eliminated.

Still another object of the invention is the provision of a clinch-nut which automatically takes care of any variations in the thickness of the metal to which it is to be attached, thereby preventing considerable trouble now encountered in the use of conventional nuts.

Another object of the invention is the provision of a clinch-nut which is smaller in size and lighter in weight, yet having more thread area than present clinch-nuts. Shorter screws may be used in connection with this nut, and the likelihood of the nut rusting in use is greatly reduced.

An additional advantage of this nut resides in the fact that the thickness may be varied without affecting the clinching operation, thereby rendering it particularly adaptable to be used as a spacer nut.

The above, as well as other objects and advantages, will be made more apparent as the description proceeds, especially when considered in connection with the accompanying drawing, wherein:

Figure 1 is a perspective view of my novel clinch-nut.

Figure 2 is a sectional view taken substantially on the plane indicated by the line 2—2 of Figure 1.

Figure 3 is a perspective view of the nut attached to a piece of metal by my clinching method.

Figure 4 is a fragmentary view of the tool used to clinch the nut shown in the accompanying views.

Figure 5 is a sectional view taken substantially on the plane indicated by the line 5—5 of Figure 3.

Figure 6 is a sectional view taken substantially on the plane indicated by the line 6—6 of Figure 3.

Before describing the present invention it may be well to briefly discuss the various types of nuts of this character which are in use at the present time. These include the screw machine, cold-headed and caged types, and differ chiefly in their method of manufacture, there being little variation in their functioning or use. The most common form of nut comprises a D shaped collar, an extending flange, and a tapped hole. The D shaped collar prevents turning in the hole in the metal, which is also D shaped to receive the nut; and the flange is upset after the nut has been inserted in the hole to lock it in place. Another form consists of an ordinary nut which is enclosed or "caged" by an envelope of sheet metal, the latter having a D shaped collar similar to that described above. One type of nut is made by utilizing an ordinary stove nut and machining it to form a nut with a D shaped collar.

All of the above mentioned nuts are quite expensive to manufacture, and in addition, are difficult to lock or clinch properly, often becoming loose after clinching. These, as well as numerous other disadvantages, are obviated by my invention.

Referring now more particularly to the drawing, it will be seen that in the embodiment herein disclosed, I have illustrated a preferred form of my invention. The reference character 10, Figure 1, indicates a clinch-nut which comprises a collar portion 11 and a body portion 12. The body portion 12 is preferably square in shape to enable it to be readily inserted in a square hole in the metal. Time in assembling is saved as the nut can be placed in the hole either way since it is square, and no fumbling is necessary as in the case of the D shaped nut which will fit in the corresponding hole in one position only. It is not intended, however, to limit the invention to square nuts, since rectangular shapes or even other forms can be used with my principle with success.

The collar 11 is formed on the lower part of the nut, and in the embodiment shown comprises two laterally extending flanges 13 and 14, which provide means for preventing the nut from being disengaged from the metal 14a (Fig. 3) in one direction. Disengagement in the other direction is prevented by shearing and clinching, as hereinafter described in detail.

A tapped hole 15 is formed through the center of the nut and provides means for receiving and holding the bolt or screw which is used in cooperation with the nut to assemble parts.

From the above brief description of the clinch-nut it can be readily seen that it has many uses in fastening together various parts of automobiles and other objects. The primary difficulty encountered in the assembly of numerous articles is the inaccessibility of the parts. In many instances ordinary means of fastening are useless since they cannot be applied with any degree of efficiency or speed. The use of my improved clinch-nut remedies this trouble since the nut can be firmly attached to one of the parts before assembly and will be in place to receive a bolt when assembling the pieces.

The method of securing my nut differs radically from methods used with other types of nuts and constitutes a primary advantage in the use of my nut over others. In Figure 4 I have shown a fragmentary view of a tool which can be used to clinch the nut. The tool is intended to be used in a machine adapted to apply considerable force and to automatically perform the shearing and clinching operation hereinafter described, but only enough of the mechanism is illustrated to enable the principle of its operation to be understood.

The tool 16 hereinabove mentioned comprises a cylindrical body portion 17 having a circular hole 18 formed therein at its lower extremity. The diameter of the hole 18 is smaller than the width of the nut by a predetermined amount and its edges are adapted to cut into and shear the top surface of the nut 10 as shown in Figures 3, 5 and 6. The lower surface of the clinching device 16 is sloped upwardly as at 19, Figure 4, to cause the sheared metal in the top of the nut 10 to be forced outwardly towards the sides and corners of the hole in the metal 14a to which the nut is being attached. This function is illustrated at 20, Figures 3 and 5, and it can be easily seen that the nut is forced or jammed into the hole in such a manner that it is held firmly therein. It will not develop looseness after the clinching operation, but is permanently secured to the metal 14a.

Although it is desirable to utilize a size of hole in the clinching device 16 slightly smaller than the width of the nut, as hereinabove stated, it is not essential to the successful clinching of the nut; since the nut 10 could be clinched by a device having a hole larger than the width of the nut. In this instance, however, the nut would be sheared and jammed against the sides of the hole in the metal 14a in the corners only, and for this reason the first-named size is to be preferred.

The present clinch-nut has great utility in that variations in the thickness of the metal to which it is to be attached do not prevent its attachment thereto. Likewise, the thickness of the nut may vary over a wide range without affecting the clinching operation. These important advantages are made possible by the fact that the clinching of the nut may occur with only a small degree of shearing or with a deep shearing action if the head or top of the nut extends a greater amount above the top of the metal 14a. No adjustment is necessary to allow for this variation since the clinching device 16 and its associated mechanism automatically compensate for any set of conditions, thereby assuring substantially uniform results at all times. Furthermore, this feature permits the use of spacer nuts of varying thicknesses without changing the clinching set-up in any way.

In assembling parts by using the clinch-nut the bolt is preferably inserted from the clinched or sheared side of the nut, since this enables the collar 11 with its extending flanges 13 and 14 to act as a stop member for the metal 14a when the bolt is tightened. My nut enables the entire thickness of the nut to be available to be tapped to form the threaded hole 15, thereby providing a much greater thread area than was possible with an old type nut of the same thickness, since a portion of the old nuts were formed with a thin wall for upsetting in the clinching process. Thus a much stronger fastening is possible with my device.

In addition to the manifold advantages in functioning as brought out in the preceding description, the commercial value of my clinch-nut is enhanced by the substantial saving possible in its manufacture. The old style nuts were wasteful of material and usually required the use of special machinery in their manufacture. Whether they were made by machining, cold-heading, or caging, numerous operations were necessary to form them with the proper collar, shape, tapped hole, and the flange for upsetting and clinching. In contrast, the manufacture of my nut can be accomplished with standard machines now in use, and with a minimum of operations. This eliminates the necessity of a large initial outlay for machinery and increases the rate of production far above that possible with old methods.

Although several methods of production are available for the manufacture of my nut, I will describe only one for the purpose of illustration. The method of making common square nuts is admirably adaptable to the making of the clinch-nut hereinabove described. Ordinary nuts are made from a long strip of metal having a rectangular cross section. This strip is punched and cut off in an automatic press, then tapped in an automatic tapping device. This method is capable of high production. If, instead of using a strip of metal having a rectangular cross-section, we use a strip having a cross-section substantially as shown in Figure 2 in the accompanying drawing, the screw machine will produce clinch-nuts of the type disclosed herein. A suitable metal or alloy should be used, of course, which is suited to be sheared and spread in the clinching process as hereinabove described in detail.

Thus it can be seen that my nut can be produced at a substantial saving, which fact, together with its apparent advantages, will aid in making it a commercial success.

I am aware that numerous details of construction may be varied through a wide range without departing from the principles of this invention, and I do not purpose to limit the patent granted, otherwise than as necessitated by the prior art.

Having described my invention, what I claim and desire to secure by Letters Patent is:

1. A clinch-nut comprising a substantially square body portion of uniform thickness and a pair of outwardly extending flat transverse base flanges.

2. A clinch-nut comprising a body portion of uniform thickness, said body having at least one straight side, and an integral laterally extending flat flange.

3. A clinch-nut comprising a body portion of uniform thickness having an integral flat transverse flange, and a threaded aperture extending through its entire thickness.

4. A clinch-nut comprising a body portion of uniform thickness having at least one straight side, an integral transverse flat flange, and a threaded aperture extending through its entire thickness.

PLUMMER E. DOUBLE.